United States Patent

[11] 3,538,963

| [72] | Inventor | James D. Adams<br>Colorado Springs, Colorado |
|---|---|---|
| [21] | Appl. No. | 683,643 |
| [22] | Filed | Nov. 16, 1967 |
| [45] | Patented | Nov. 10, 1970 |
| [73] | Assignee | J. D. Adams Co.<br>Colorado Springs, Colorado<br>a corporation of Colorado |

[54] LUMBER COMPONENT CUTTING MACHINE
6 Claims, 7 Drawing Figs.

[52] U.S. Cl. ............................................. 143/6, 143/38
[51] Int. Cl. .............................................. B27g 5/02
[50] Field of Search ......................... 143/38, 6+, 52, 53, 54; 92/151, 152; 91/411(A), 216

[56] References Cited
UNITED STATES PATENTS

| 823,506 | 6/1906 | Cadorette et al. | 143/6 |
| 979,895 | 12/1910 | Spencer | 143/6 |
| 1,000,784 | 8/1911 | Cumming | 92/152X |
| 1,123,442 | 1/1915 | Watt | 143/6 |
| 1,289,795 | 12/1918 | Johnson | 91/411(A)UX |
| 2,995,162 | 8/1961 | Mountain | 143/38X |

*Primary Examiner*—Donald R. Schran
*Attorney*—Richard D. Law

ABSTRACT: A machine for cutting lumber members into component parts of prefabricated construction members, such as trusses, panels, etc., having a series of power saws mounted above and below a vertical movable lumber holding platform includes at least a pair of disappearing lumber clamps for positioning and holding a piece of lumber in proper position for cutting and releasing the same after cutting. The clamps fold down leaving an uninhabited working area and with both sides of the table open for movement of lumber. The movable table is powered to move lumber up into overhead saws and down into saws beneath the table for producing the desired number and types of cuts on the lumber.

Patented Nov. 10, 1970

3,538,963

INVENTOR.
JAMES D. ADAMS

Richard D. Law
ATTORNEY

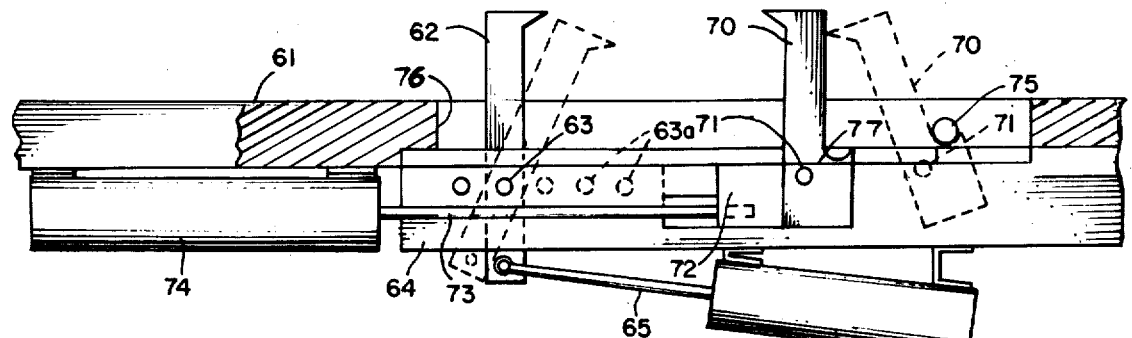
FIG. 2
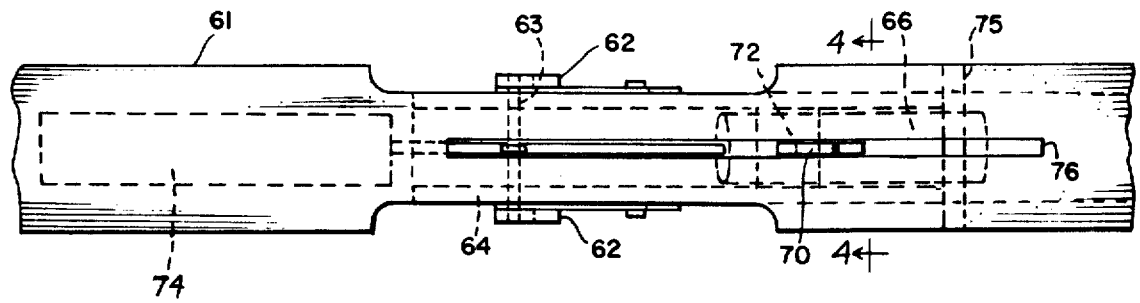
FIG. 3
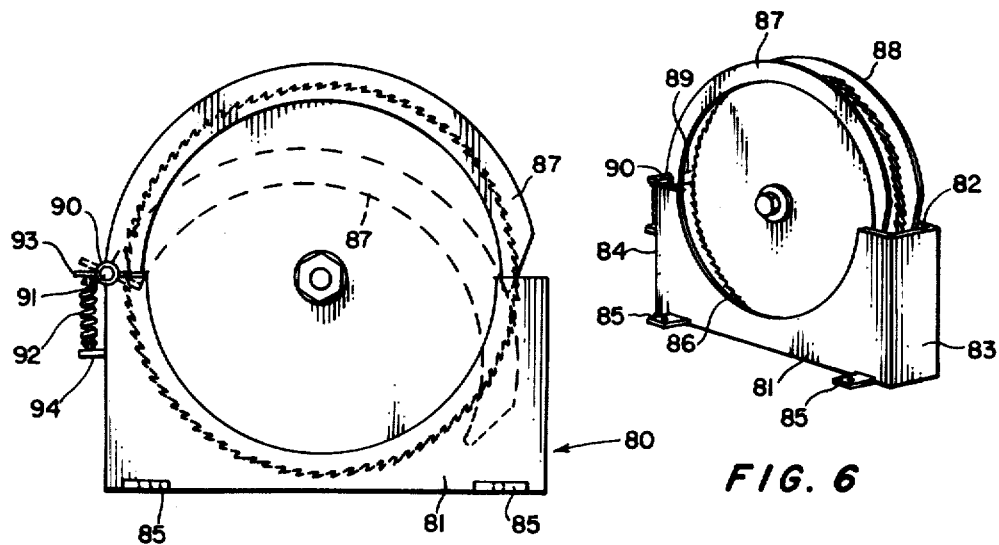
FIG. 5
FIG. 6
INVENTOR.
JAMES D. ADAMS

LUMBER COMPONENT CUTTING MACHINE

Increases in the cost of building construction has opened a large market for prefabricated portions of buildings, particularly more complicated units which are premade and which are readily and easily placed into the construction itself. Such elements as roof trusses, wall panels, roof gable panels, etc., are easily manufactured at a fabrication plant, transported to a building site for incorporation and assembly into the construction. Being made under controlled conditions, such units are quite uniformed, are very strong and are generally less expensive than similar units formed on the job. Furthermore, less skilled labor is required in the actual building construction, since such units as roof trusses require accurate compound cuts and very accurate measurements on various components of such trusses to provide accurate fitting components.

Each prefabricated unit consists of a number of lumber component parts fastened together, usually by some sort of gusset plates and nails. For mass production, a large number of components are precut, and then assembly of a number of units may be accomplished from the components. Each component includes at least two cuts, one on each end, and in some cases two cuts are required on at least one end. Such double cuts are termed multiple or compound cuts and are made with two saws on a component forming unit or machine.

According to the present invention I have provided an improved component saw using a vertically movable worktable for moving a piece of lumber into one or more of four saws for cutting such lumber into components for prefabricated construction units. A series of disappearing clamp assemblies are mounted on the table for accurately holding lumber in position for cutting and then retracting for leaving an unencumbered worktable for placement and removal of the lumber pieces. Three such clamps are preferably provided on the table, at both ends and one in the center, to securely hold the lumber and to eliminate normal crown when long pieces of lumber are held near the ends. The unit utilizes double acting cylinders at each end of the movable worktable for positively moving the table vertically in up and down directions, and an air cylinder powers a radial arm saw for making scarf cuts when necessary.

Included among the objects and advantages of the present invention is to provide a multiple power saw assembly for making component parts of wooden building structures.

Another object of the invention is to provide a system for sequentially raising and lowering a worktable for moving a wooden structural member into multiple overhead or under table saws.

A further object of the invention is to provide a multiple power saw assembly with lumber clamps arranged to position lumber for sawing and to disappear so as to leave the worktable clear of obstructions.

A still further object of the invention is to provide a clamp for a degree plate of a power saw insuring proper positioning and holding of the saw for desired cuts on lumber.

Further objects and advantages of the invention may be readily ascertained by referring to the following description and appended illustrations in which:

FIG. 2 is a side elevational view of a clamp arrangement for holding lumber;

FIG. 3 is a top plan view of the clamp arrangement of FIG. 2;

FIG. 4 is a cross-sectional view of the clamp assembly of FIG. 3 taken along section lines 4—4;

FIG. 5 is a side elevational view of a saw guard for covering rotary saws;

FIG. 6 is a perspective view of the saw guard of FIG. 5; and

FIG. 7 is a fragmentary side elevational view of a degree wheel clamp for holding a saw in position in the assembly.

Figure 1:
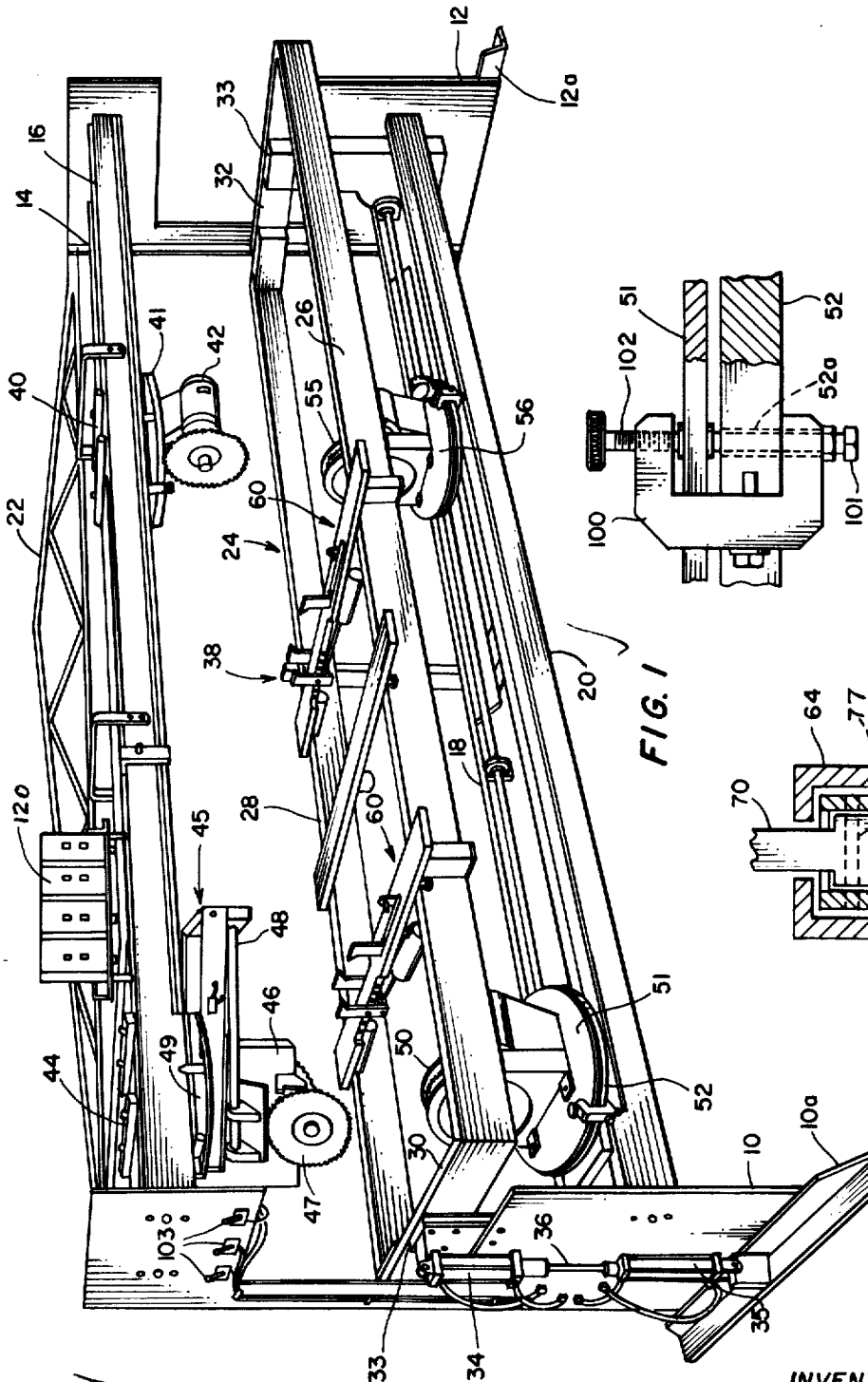
FIG. 1 is a perspective view of a multiple power saw assembly for making component cuts on wooden structure members, according to the invention.

In the assembly shown in FIG. 1, a frame assembly comprises end plates 10 and 12 which, also, provide a footing, by means of an angle 10a attached to the end plate 10 and an angle 12a attached to the end plate 12. A pair of top frame members 14 and 16 are attached to the top of the ends 10 and 12 and a pair of lower frame members 18 and 20 connected between the two end plates completes the major frame assembly. A truss assembly 22 is secured to the top of the frame to provide rigidity in the frame, since such frames are normally in excess of 20 feet long. A vertical movable table, shown in general by numeral 24, includes front member 26 and rear member 28 secured together by means of ends 30 and 32. The members are preferrably channels for lightness and strength. The table is mounted on a track arrangement 33 at each end of the table, to provide guided vertical movement of the table. An assembly comprising a pair of opposed fluid-actuated cylinders 34 and 35 are mounted at each end of the table assembly to provide means for moving the table up and down as desired. The cylinders are attached on opposed ends of a common piston rod 36, with a lower cylinder 35 attached to the base 10a and a top cylinder 34 attached to the table. The cylinders are arranged to act independently, so as to move the table up by extension of a piston rod from the cylinder 34 and to move the table down by retraction of the piston rod into the cylinder 35. An extensible back brace arrangement 38 provides stability for the middle of the long span of the table, the brace being attached to the lower frame members 18 and 20, and it provides a guide track for the table. A saw mounting 40 is adjustably mounted on the crossmembers 14 and 15 at one end at the frame top and this mounting rotatably supports a degree plate 41 on which is mounted a motor-saw arrangement 42. The mounting is movable along the crossmembers to provide a means for positioning the saw to the desired distance from a saw at the other end. At the opposite end of the top frame members is an adjustable mounting 44 supporting a degree plate 49 on which is mounted a radial arm saw 45. The saw assembly includes a cylinder actuated carriage 46, on which is mounted a motor and saw assembly 47, reciprocable along a track 48 on activation of the cylinder, to provide a scarf cut. The degree plate 49 permits the saw to be turned at the desired angle and the movement of the saw along the track 48 allows long cuts at acute angles on the lumber. As with the other mounting 40, the mounting 44 is adjustably movable along the top rails to provide a cut on a lumber piece as desired.

A pair of motor and saw assemblies are mounted in a similar manner on the bottom frame members, and at one end a saw and motor assembly 50 is mounted on a degree plate 51 which is rotatably held on a mounting assembly 52. The mounting assembly is secured in position by such clamp means as shown for the upper frame members. In a like manner, a saw and motor assembly 55 mounted on a degree plate 56 which is rotably secured on a mounting arrangement on the lower frame members. In all cases the degree plates, on which the motor-saw assemblies are mounted, are rotated mounted on an assembly which is adjustably clamped on the frame members. The frame members may be marked with a scale for fast and easy setting for the desired cuts on the lumber. The degree plates permit an easy method of setting the angle of cut.

As shown in FIG. 1 a pair of lumber clamps, shown in general by numeral 60, are adjustably mounted on the table and are in spaced-apart positions, however, for long pieces of lumber it may be desirable to utilize three or more of the clamps which operate in unison to securely hold the lumber in position and prevent the inherent bow which occurs when only two clamps are used on long pieces of lumber. The clamps are shown in detail in FIGS. 2 and 3 and they include a mounting plate 61 which is arranged to be clamped to the table side members. Such clamps are conventional and may simply be a bolt and nut assembly clamping the plate on the channels. A pair of spaced-apart, bracing jaws 62 are pivotally mounted by means of a pivot pin 63 to a frame 64 which is secured to the bottom of plate 61. The abutting jaws 62 pivot from an upright position to a horizontal position, in the cutout side areas, a round pivot pin 63. In down position, the jaws are completely below the top surface of the plate 61. The bracing jaws 62 are pivotally secured to a piston rod 65 which is actuated by a fluid cylinder 66. The fluid leads to the piston 66 not shown for clarity, but it is understood that inlet and outlet lines as conventionally used are provided. The lumber stock bracing jaws 62 are adjustable along the frame 64 for different sizes of lumber by changing the position of the pivot pin 63 into one of the holes 63a in the frame 64. The other portion of the clamp jaw includes a pivotal jaw 70 which is mounted by a pivot pin 71 on a reciprocal carrier 72 mounted in the frame 64. The carrier 72 is attached to the outer end of a piston rod 73 which is actuated by a fluid cylinder 74. A shoulder 77 slips under the top rails of the frame 64 to move the lug 70 in an upright position as the lug is moved from the retracted position shown in dash lines toward the cylinder. To force the jaw of the lug 70 into the retracted position, a pin 75 mounted on the frame 60 contacts the back of the jaw and forces it to pivot around the pivot pin 71 so that the shoulder moves beyond the top rail end and the lug moves into retracted position below the top surface of the plate 61. The jaw 70 travels in a slot 76 in the plate 61 and it retracts through the slot as explained above.

For safety, a saw guard is provided for each of the saw blades, and the guard includes a base member, shown in general by numeral 80 in FIGS. 5 and 6, which is a metal receptacle having sidewalls 81–82, and ends 83–84. Feet 85 are provided for fastening the guard to a base. Circular cutouts 86 on each side permits easy access to the saw blade and arbor. Pivotally mounted from one end of the base member is a bifurcated cover member which includes arcuate side portions 87 and 88 joined together at the back 89. The back 89 terminates in a sleeve portion and pivot pin holder 90 on the base jointly form a hinge for the bifurcated top portion 87 and 88. A pivot pin 91 pivotally secures the bifurcated member on the base member 80. A helical spring 92 secured between extension 93 on the bifurcated portion and an extension 94 on the base normally biases the upper section in covering position with the teeth of the saw. It is seen that a piece of timber pushed against the top section moves it downwardly, against spring tension, exposing the saw teeth, and the guard moves sufficiently far to permit the lumber to pass through the saw blade.

Each of the saw-motor assemblies is mounted on a degree plate which is pivotally mounted on a base plate so that the angle of the saw in relation to the worktable may be accurately known. A clamp is required to hold a degree plate and the mounted saw in proper position. For this purpose a C-clamp 100, FIG. 7, is arranged with a lower screw assembly 101 which passes through an opening 52a in the base plate 52. The degree plate 51 is then held by a thumbscrew 102 against the top of the bottom screw of the C-clamp. The bottom bolt permits the degree plate to be held in position without distorting the plate. A pointer may be provided on the base plate for indicating the angle on the degree plate.

In normal operation, the lumber clamps are retracted in the plates on the table so that a lumber piece may be placed on the table in a somewhat centered position. Fluid pressure is then applied to the cylinders for the clamps which raises the jaws of a clamp and forces them together, securely holds the lumber on the table. One of the valves 103 on the end plate 10 is actuated to apply fluid pressure to the cylinder 34, for example, to raise the held lumber into the saws 47 and 42 making two cuts. With the saws preset the lumber is accurately cut to length. It is noted that the cylinders for raising the table are mounted at both ends to permit uniform movement of the table on the guide tracks. When the table is moved into the top position a microswitch, not shown, actuates a valve for inducing fluid pressure to the radial arm saw, moving it outwardly to make the scarf cut along the lumber if necessary. On a timing cycle, the timer not being shown but may be conventional timers used in hydraulics, the fluid pressure is released from a actuator of a radial arm saw, and the saw returns to normal position. The double acting cylinder 34 is then reversed so that the table is returned to its middle position where the fluid has been released from the cylinder 34. One of the other switches 103 may be activated to induce fluid pressure to the cylinder 35 to pull the table down against the saws 50 and 55 to provide still another cut or two if the same is necessary. In many instances it may be that three of the four saws may be used, or in other cases only two of the four saws may be used. In cases where one or more of the saws are not used, the motor-saw mount may be moved toward the end of the unit, and in each case, the power is disconnected from the motor so that it does not run. In some cases it may be desirable to use only the lowering cycle of the table. In other cases it may be desirable to only use the raising cycle of the table for the cuts. In still other cases it may be necessary to use both the movement upward and the movement downward of the table. The operation of the table is determined by the type and number of cuts necessary on the lumber. It is noted that scales may be placed along the rails, either on the bottom or the top rails of the frame, and, also, on the table bed that the saws may be very accurately positioned without external measuring members. Exact angle of each cut is very easily achieved by loosening the clamp on each of the degree plates and rotating the motor saw to the desired degree, and then tightening the clamp which holds the degree plate securely in position for the accurate angle cut.

After all the desired cuts are made on the lumber piece, the table is then returned to a centered position, and the clamps cylinders are deactivated so that all the jaws retract. This leaves an uninhibited worktable, and the finished lumber piece may be pushed through and off the table at the back of the assembly. This is an important feature since one man can then operate the unit by having a conveyor on the front of the saw and a conveyor at the back of the saw. With this a man may merely lift the lumber off the front conveyor, place it in the table and actuate the mechanism for the clamps making the cuts, and the conveyor release the clamps. The operator then pushes the lumber off the table onto the back conveyor or simply on a pile on the floor. Thus, the clamp arrangement provides a direct action for mass production.

The controls for the unit are more or less standard, since timed air or hydraulic circuits are well known in the art. The motors are preferably electric motors, however, fluid drive motors may, also, be used. The cylinders are preferably air, however, hydraulic cylinders are satisfactory. The actuation of the table, may be accomplished by electric motors or the like, however, air motors have been found highly satisfactory for direct and positive action in operation. Also, after a setup or a particular operation, a control panel 120 provides control for an operator standing in front of the unit.

While the invention has been illustrated by reference to a particular embodiment there is no intent to limit the spirit and scope of the invention to the precise details so set forth except as defined in the following claims.

I claim:

1. A mitering machine assembly including at least two opposed power saws for cutting wooden components from lumber, and including a frame, said opposed saws mounted on said frame and a movable lumber supporting bed for holding the lumber to be cut into wooden components, means for moving said supporting bed into at least one said saw for making a cut, the improvement of at least a pair of releasable lumber clamps mounted on and movable with said bed; each such clamp including at least one abutting member pivotally mounted and arranged to pivot to a retracted position completely below the lumber supporting surface, and at least one clamping jaw arranged to move toward said abutting jaw in an upright position for clamping a lumber member therebetween and away from said abutting jaw to position where it retracts below the lumber supporting surface leaving the surface uninhibited; means for moving said clamping jaw toward and away from said abutting jaw; means for pivoting said abutting jaw to and from a retracted position; and means for retracting said clamping jaw.

2. In an assembly according to claim 1 the improvement wherein said means for pivoting said abutting jaw is a fluid cylinder.

3. In an assembly according to claim 2 the improvement wherein said means for moving said clamping jaw is a fluid cylinder.

4. In an assembly according to claim 3 the improvement wherein said at least one clamping jaw is pivotally mounted on a reciprocable carrier attached to the piston rod of said fluid cylinder, and pivotal on contact with a stop.

5. In an assembly according to claim 4 the improvement wherein said reciprocable carrier is mounted in a frame including upper guide tracks, and said clamping jaws include opposed shoulders arranged to move under said tracks and thereby pivot said clamping jaw to an upright position.

6. A mitering machine assembly according to claim 1 being further characterized by at least a pair of fluid cylinders mounted in opposed relation on a single piston rod at each end of said lumber supporting bed; when said bed is in neutral position one said cylinder having its piston extended and the other retracted for moving said bed in a positive movement both upwardly and downwardly from said neutral position, means for actuating corresponding cylinders at opposed ends of said bed; and track means on said end frames for guiding said bed in controlled vertical movement.